United States Patent
Cook et al.

(10) Patent No.: US 11,208,942 B2
(45) Date of Patent: Dec. 28, 2021

(54) EXHAUST MANIFOLD CLAMP FOR THE MANIFOLD-CYLINDER HEAD JOINT

(71) Applicant: Cummins Inc., Columbus, IN (US)

(72) Inventors: Daniel A. Cook, Daventry (GB); Simon Anthony Burge, Rugby (GB); Milind Subhash Deulkar, Leicester (GB); Thomas James Anthony Bennett, Long Buckby (GB); Kieran J. Richards, West Haddon (GB); Timothy S. T. King, Long Buckby (GB); Daniel C. Sopp, Northampton (GB)

(73) Assignee: Cummins Inc., Columbus, IN (US)

( * ) Notice: Subject to any disclaimer, the term of this patent is extended or adjusted under 35 U.S.C. 154(b) by 210 days.

(21) Appl. No.: 16/568,804

(22) Filed: Sep. 12, 2019

(65) Prior Publication Data

US 2020/0003105 A1   Jan. 2, 2020

Related U.S. Application Data

(63) Continuation of application No. PCT/US2018/022586, filed on Mar. 15, 2018.

(60) Provisional application No. 62/475,355, filed on Mar. 23, 2017.

(51) Int. Cl.
*F01N 13/18* (2010.01)
*F01N 13/10* (2010.01)

(52) U.S. Cl.
CPC .......... *F01N 13/1811* (2013.01); *F01N 13/10* (2013.01); *F01N 13/1805* (2013.01); *F01N 13/1855* (2013.01)

(58) Field of Classification Search
CPC .... F01N 13/1805; F01N 13/10; F01N 13/105; F01N 13/1811; F01N 13/1816; F16L 21/06; F16L 41/08; F16L 23/028–036
USPC .................................................. 60/321, 323
See application file for complete search history.

(56) References Cited

U.S. PATENT DOCUMENTS

| 2,681,817 | A | 6/1954 | Demlow |
| 3,177,469 | A | 4/1965 | Tromel |
| 3,819,209 | A | 6/1974 | Janle |
| 5,918,912 | A | 7/1999 | Keifel et al. |
| 7,185,490 | B2 | 3/2007 | Smatloch et al. |
| 2005/0268602 | A1 | 12/2005 | Smatloch et al. |

(Continued)

FOREIGN PATENT DOCUMENTS

| EP | 0849446 | 12/1997 |
| EP | 1571305 | 12/2004 |
| WO | 2009003668 | 1/2009 |

OTHER PUBLICATIONS

Translation of Janthur WO 2009003668 (Year: 2009).*

(Continued)

*Primary Examiner* — Mark A Laurenzi
*Assistant Examiner* — Mickey H France
(74) *Attorney, Agent, or Firm* — Taft Stettinius & Hollister LLP

(57) ABSTRACT

Systems, devices, and methods are disclosed for clamping an exhaust manifold to a cylinder head with at least one clamp that is configured to allow thermal expansion and movement of the exhaust manifold while preventing exhaust leaks through the exhaust manifold and cylinder head connection.

22 Claims, 16 Drawing Sheets

(56) References Cited

U.S. PATENT DOCUMENTS

2012/0247415 A1 10/2012 Kim et al.

OTHER PUBLICATIONS

Search Report and Written Opinion , PCT Appln. No. PCT/U18/22586, 9 pgs, dated May 31, 2018.
Examination Report Under Section 18(3), GB Appln. Serial No. 1913559.9, dated Jun. 23, 2021, 2 pgs.

\* cited by examiner

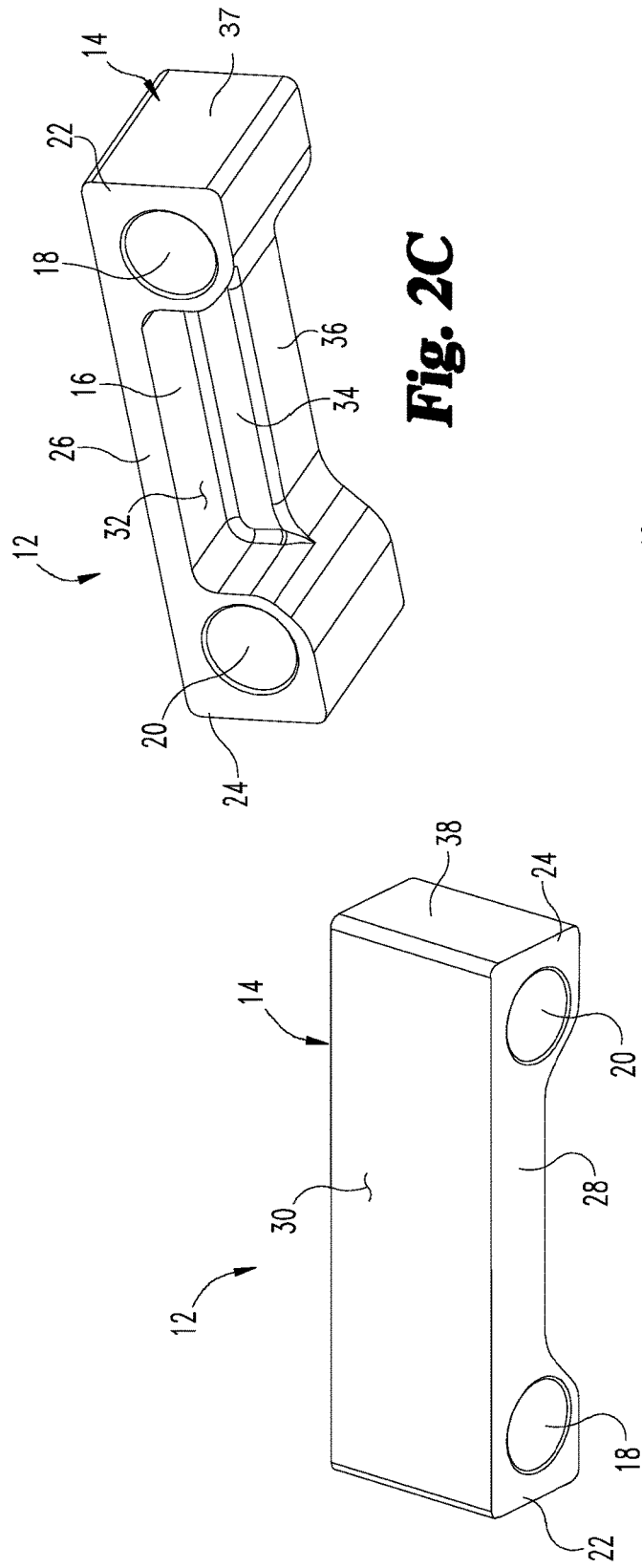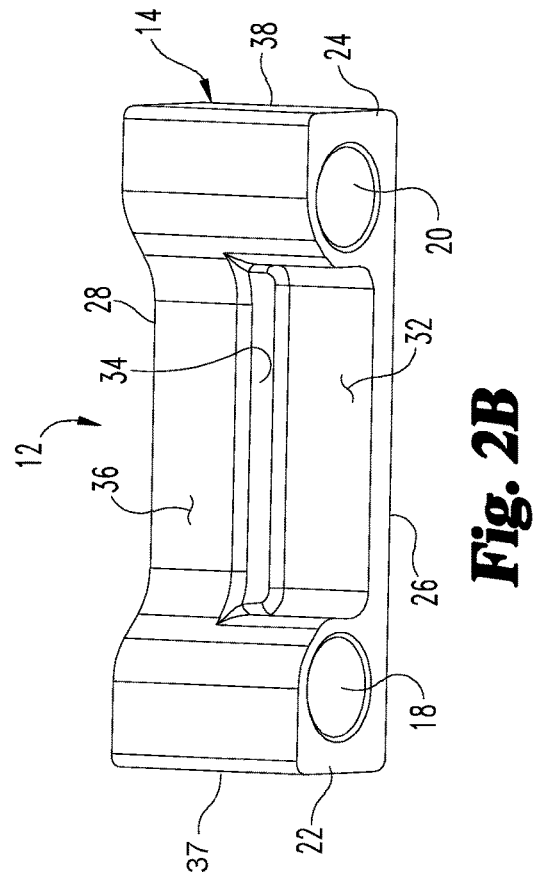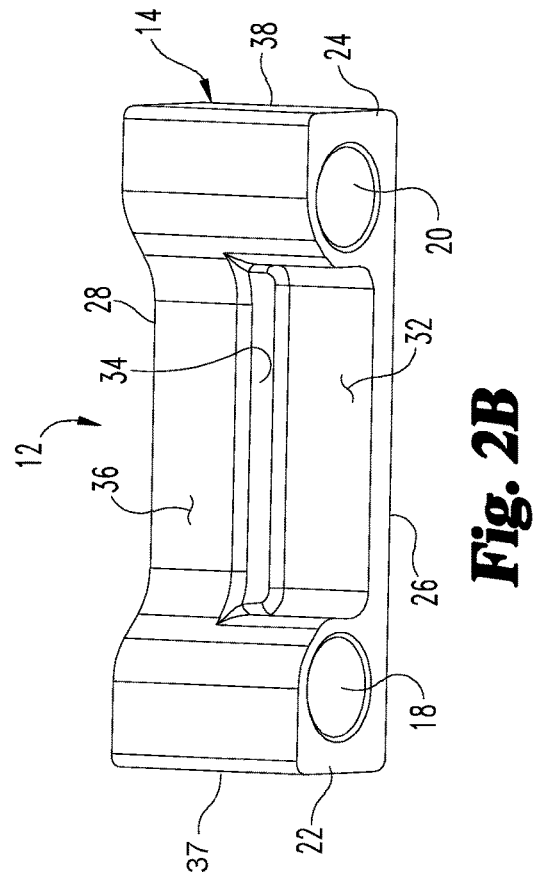

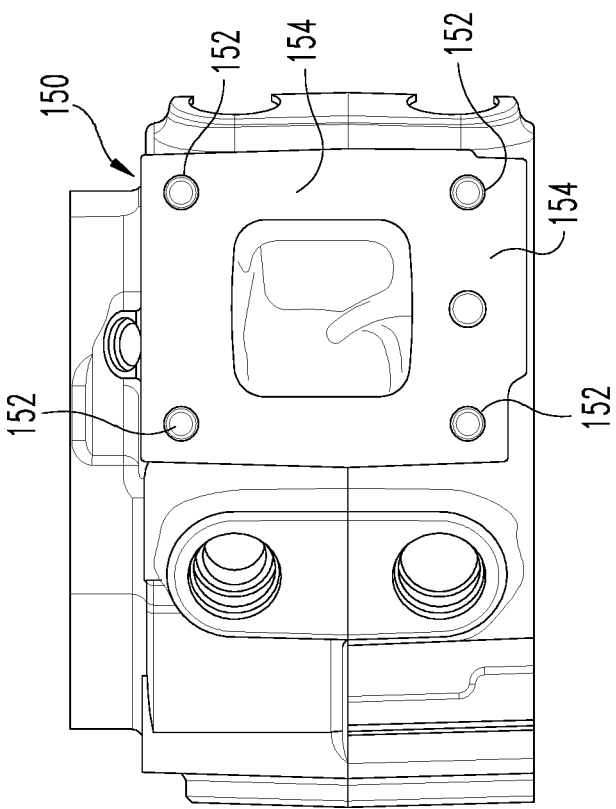
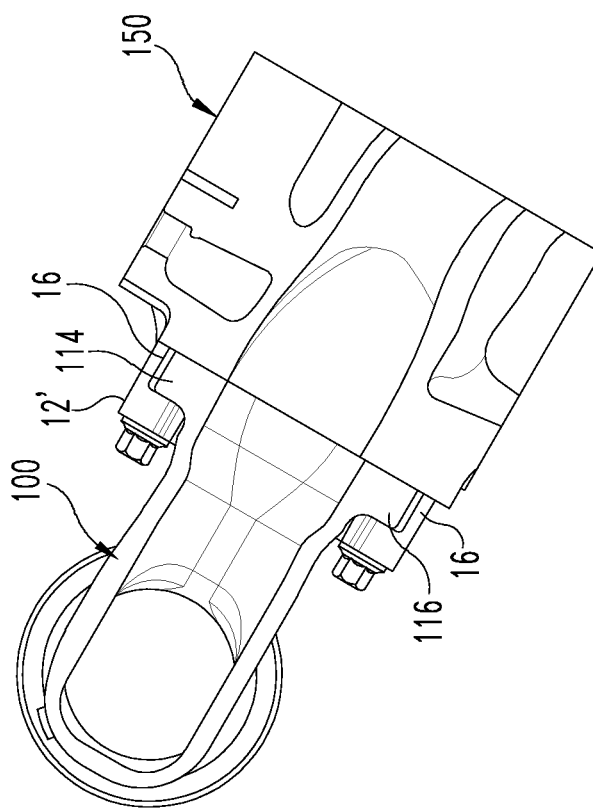
Fig. 8B
Fig. 8A

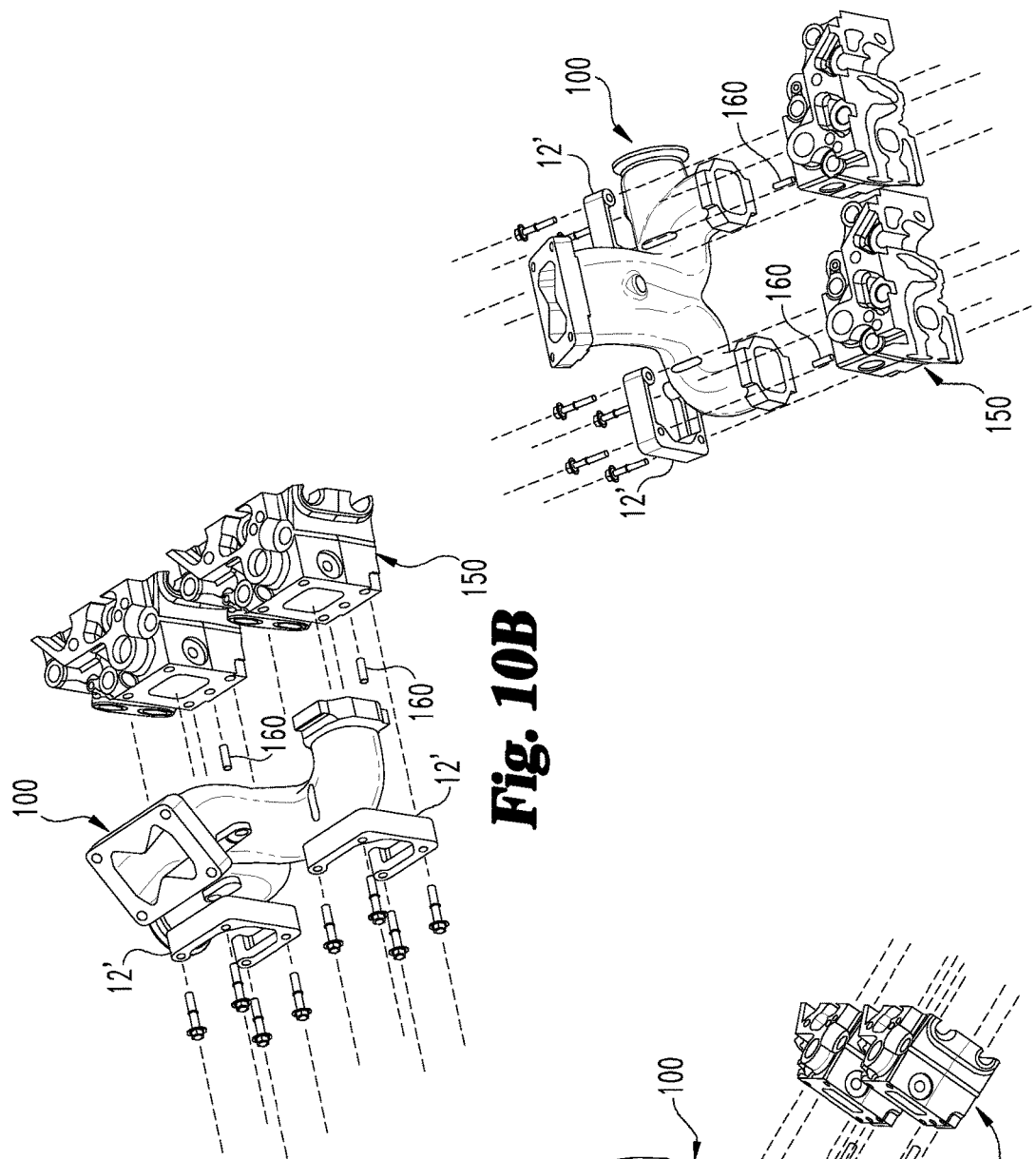
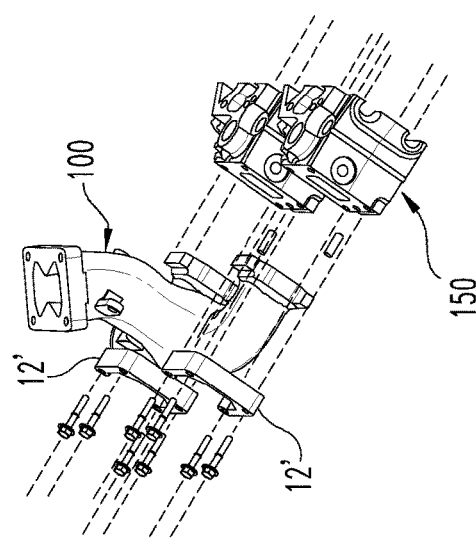
Fig. 10A
Fig. 10B
Fig. 10C

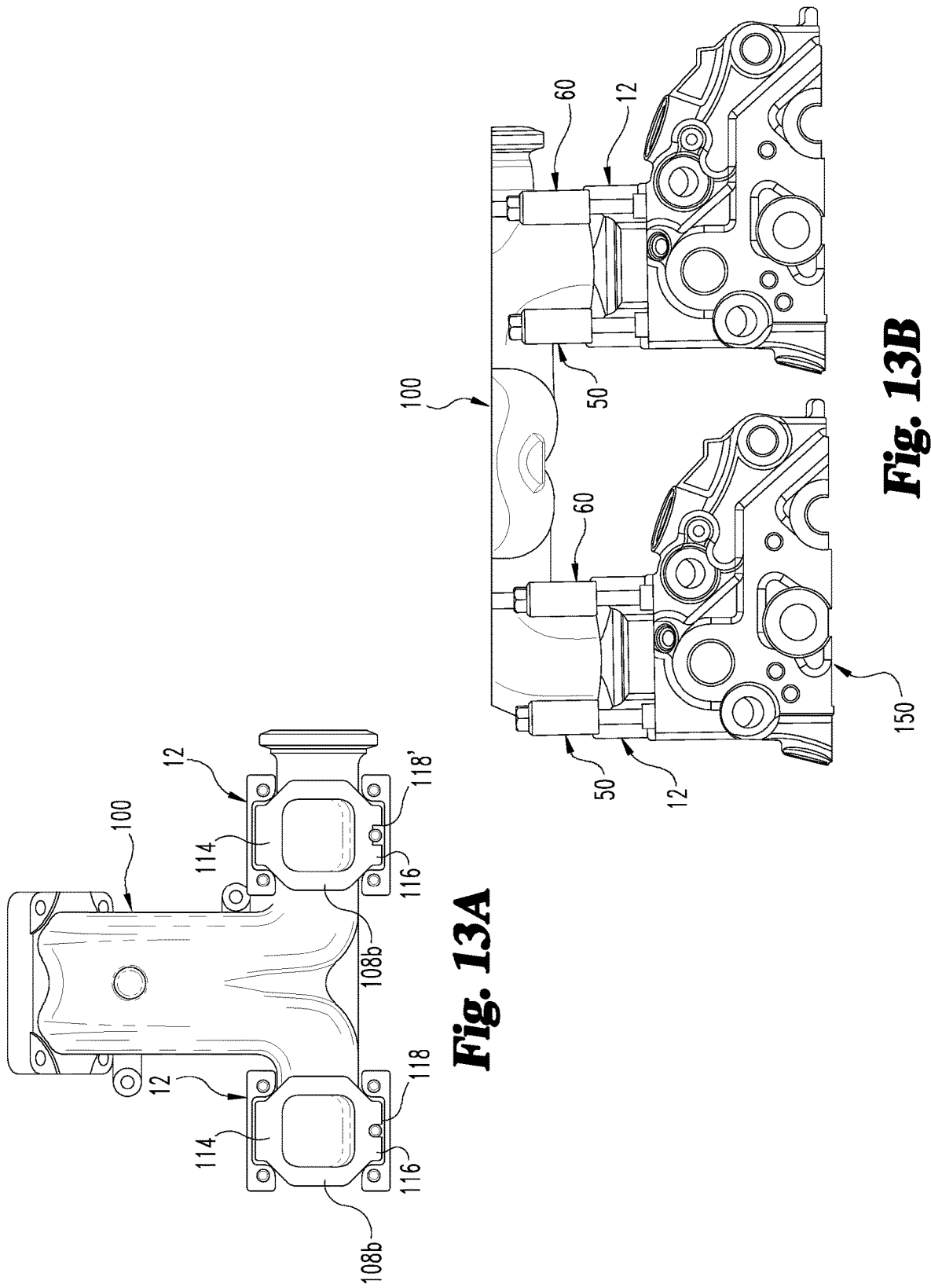

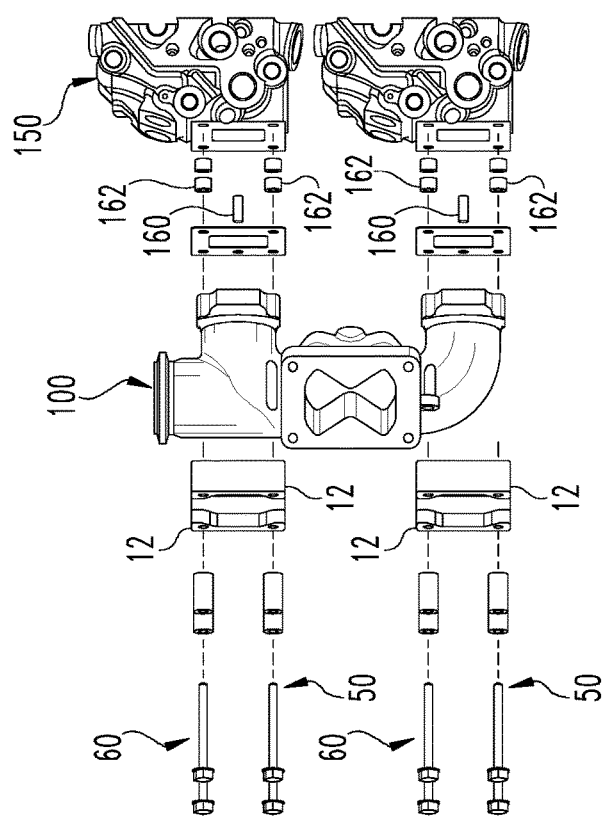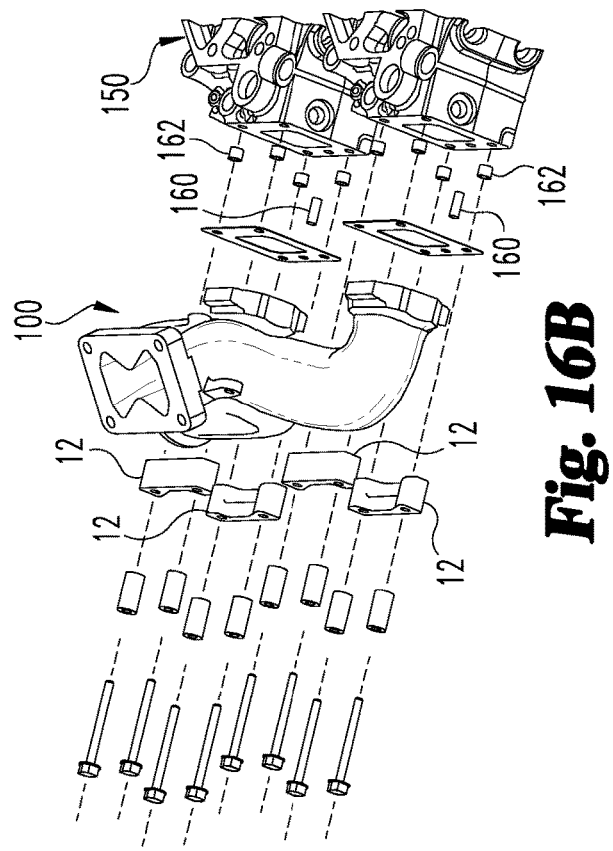

EXHAUST MANIFOLD CLAMP FOR THE MANIFOLD-CYLINDER HEAD JOINT

CROSS-REFERENCE TO RELATED APPLICATION

The present application is a continuation of PCT Application No. PCT/US18/22586, filed Mar. 15, 2018, which claims the benefit of the filing date of U.S. Provisional Application Ser. No. 62/475,355 filed on Mar. 23, 2017.

FIELD OF THE INVENTION

The present invention relates generally to internal combustion engines, and more particularly to an exhaust manifold clamp for the manifold-cylinder head joint.

BACKGROUND

Operating conditions for exhaust manifolds can result in exhaust leakage and component failure do to the high heat, stresses, and thermal expansion events that occur. These conditions are even more problematic as the power rating and size of the engine increases. Therefore, further improvements in this technology area are needed to address these issues, among others.

SUMMARY

One embodiment of the present disclosure includes a unique system, method and/or apparatus for securing an exhaust manifold to a cylinder head. In one embodiment, a clamp is provided that includes a body with a recessed portion for receiving a flange of the exhaust manifold. Bores through the body of the clamp adjacent to the ends of the recessed portion are provided to receive fasteners that couple the clamp to the cylinder head and clamp the exhaust manifold to the cylinder head with the clamp.

Other embodiments include dowels between the cylinder head and exhaust manifold flange that assist in locating the flange on the cylinder head for position piloting and constraint in at least one of the vertical and crank axis directions of the engine. Still other embodiments employ a low friction coating and/or wear pads on the exhaust manifold flange to allow exhaust manifold motion relative to the clamp due to thermal expansion of the exhaust manifold, which reduces or prevents bending stresses from being transferred to the fasteners that couple the clamp to the cylinder head. In addition, the clamp reduces the manifold stress and reduces or prevents thermal ratcheting risks.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like numerals refer to like parts throughout the several views, and wherein:

FIGS. 2A-2C are various perspective views of another embodiment exhaust manifold clamp.

FIG. 8A is a section view through the cylinder head and exhaust manifold showing the exhaust manifold C clamp mounted to the exhaust manifold flange, and FIG. 8B is a section view through the cylinder head showing the mounting holes for the ring dowels and alignment dowel.

FIGS. 10A-10C are additional exploded perspective views of the cylinder head and the exhaust manifold and exhaust manifold C clamps in FIGS. 5A-5B, with the gasket omitted from the Figures.

FIG. 13A is an elevation view looking toward the mounting faces of the exhaust manifold with the clamps on the mounting flanges of the exhaust manifold and FIG. 13B is a cross-sectional view showing the clamps engaged to the exhaust manifold and to the cylinder head with the fasteners.

FIGS. 16A-16B are additional exploded perspective views of the exhaust manifold and exhaust manifold clamps of FIGS. 12A-12B and the cylinder head.

DESCRIPTION OF THE ILLUSTRATED EMBODIMENTS

Figure 1A:
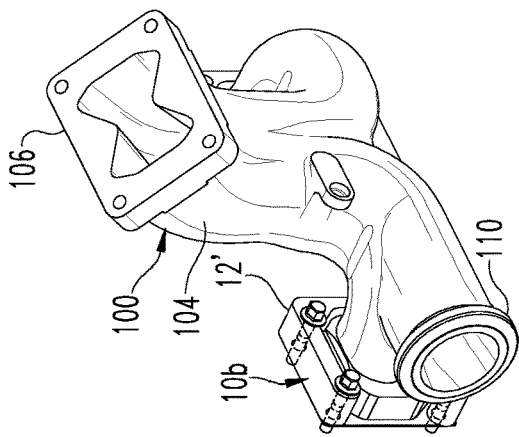
FIGS. 1A-1D are various perspective view of one embodiment exhaust manifold clamps mounted to an exhaust manifold.
Figure 1B:
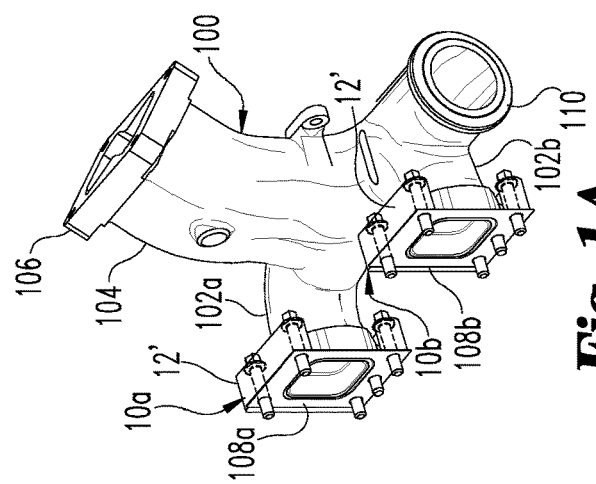
Figure 1D:
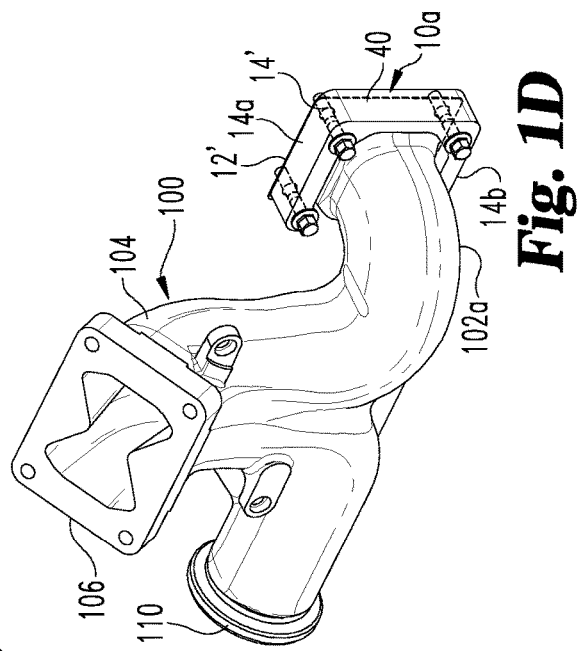
Figure 1C:
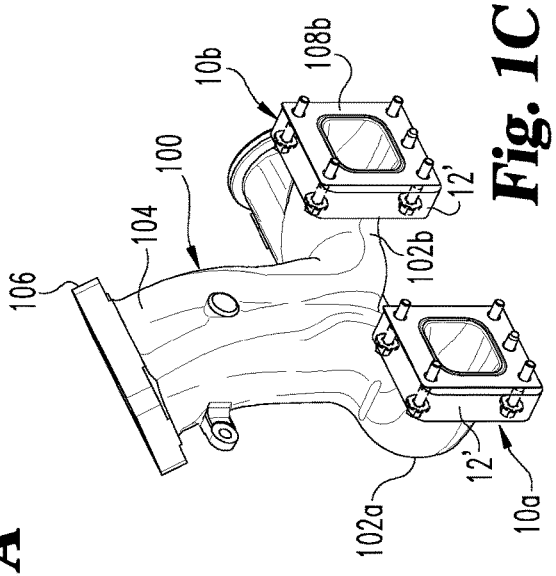

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIGS. 1A-1D show various perspective views of one embodiment of an exhaust manifold 100 with one embodiment of first and second clamp assemblies 10*a*, 10*b* mounted thereto. In the illustrated embodiment, exhaust manifold 100 includes a first inlet portion 102a and a second inlet portion 102b that are connected to a common outlet 104. Common outlet 104 includes an outlet flange 106. Exhaust manifold 100 also includes a connecting portion 110 that can be connected to another exhaust manifold to form an exhaust manifold assembly with two or more exhaust manifolds 100 connected to one another.

Figure 7A:
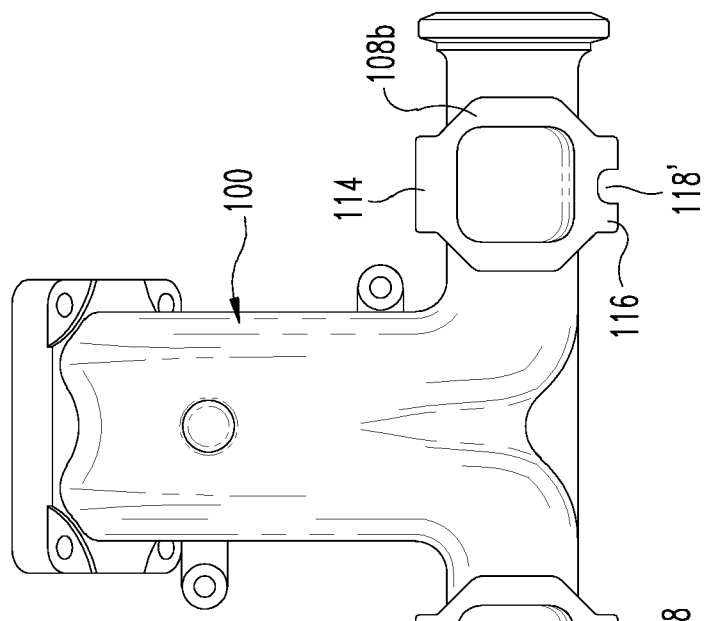
FIGS. 7A-7B are perspective views of the exhaust manifold of FIGS. 6A and 5A, respectively, with the exhaust manifold C clamps removed.
Figure 7B:
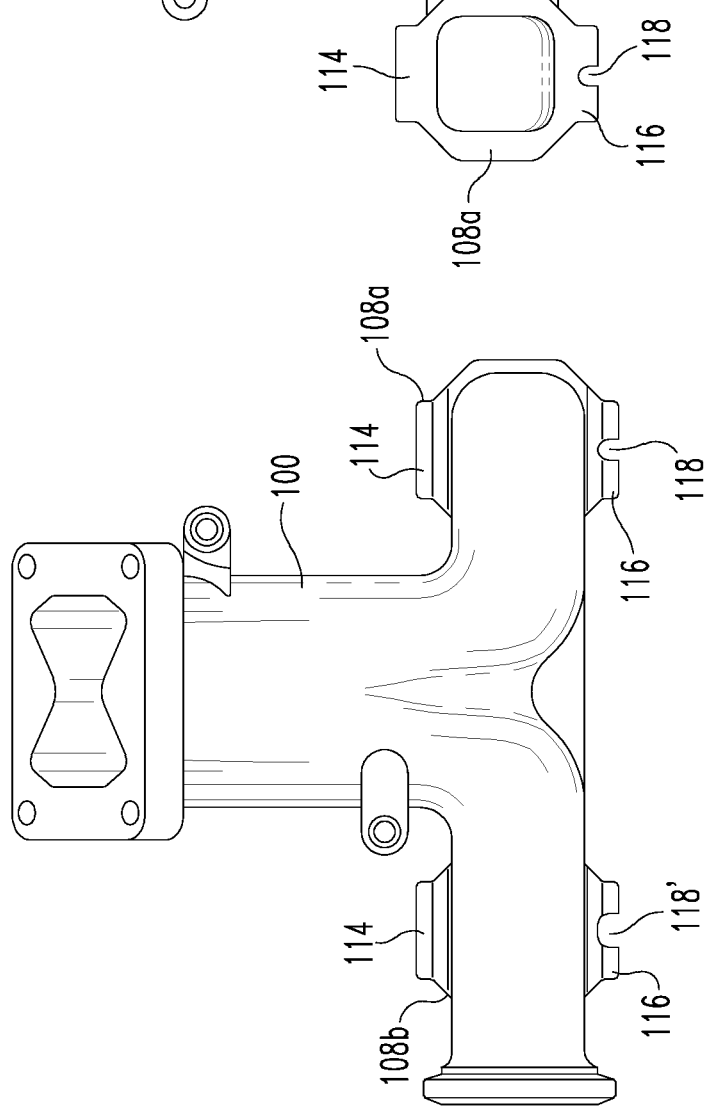
Figure 9B:
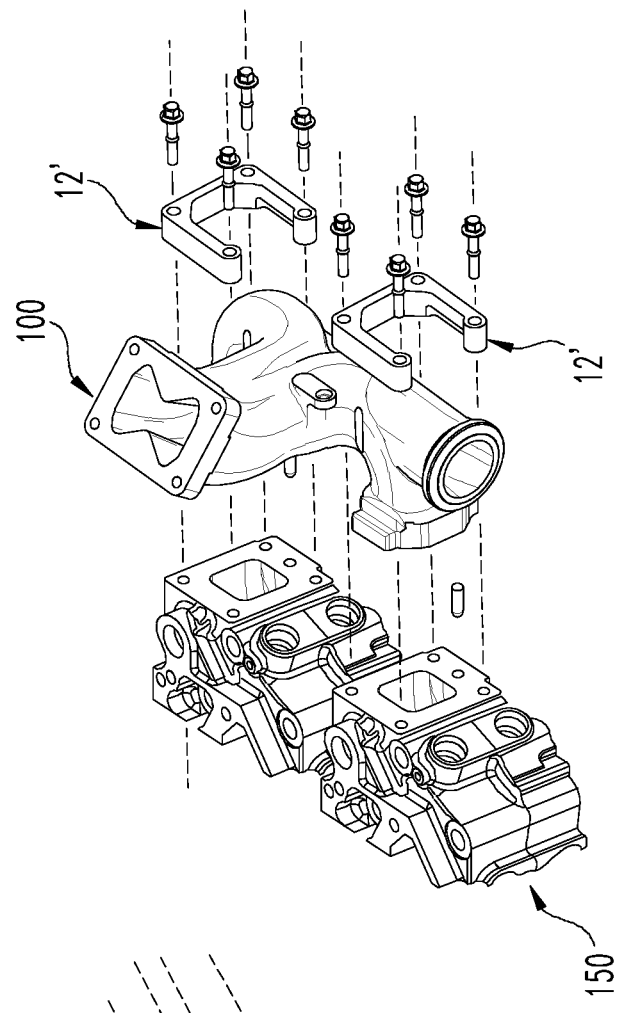
FIGS. 9A-9B are exploded perspective views of the cylinder head and the exhaust manifold and exhaust manifold C clamps in FIGS. 5A-5B, with the gasket omitted from the views.
Figure 9A:
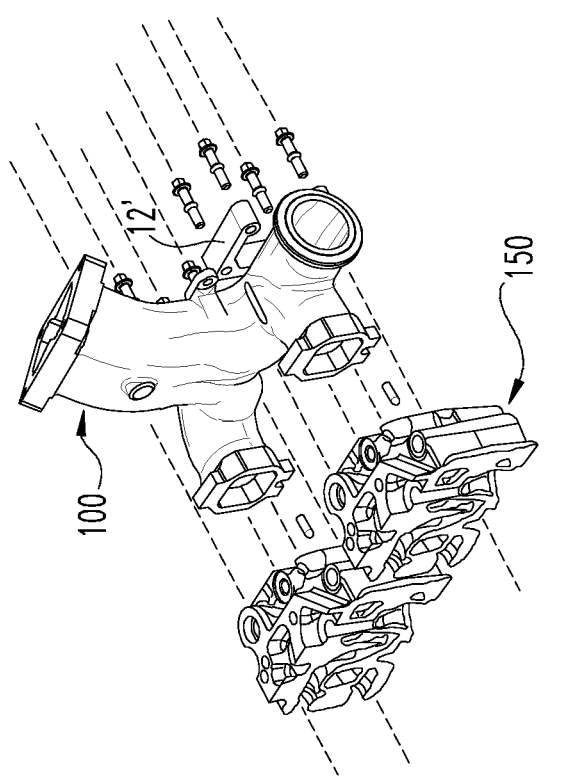
Figure 11C:
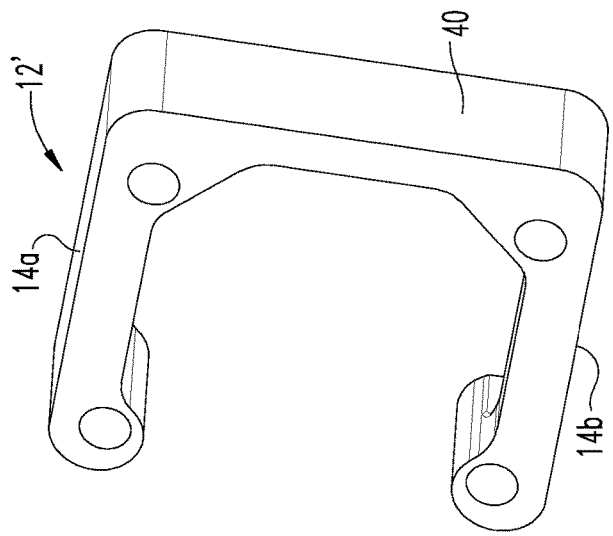
FIGS. 11A-11C are various perspective views of the C shaped embodiment exhaust manifold clamp.
Figure 11B:
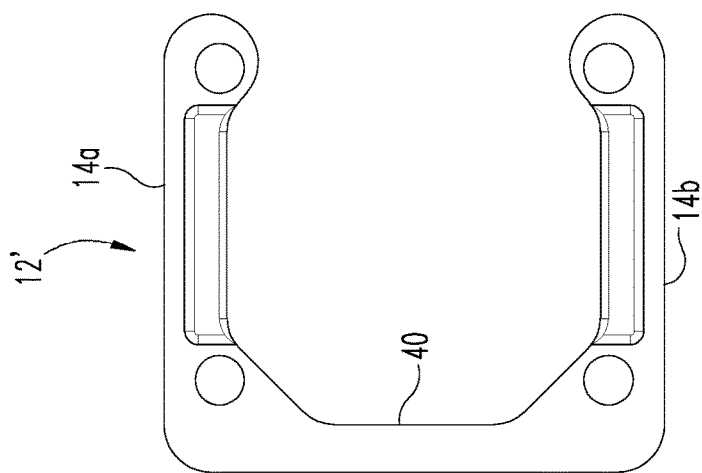
Figure 11A:
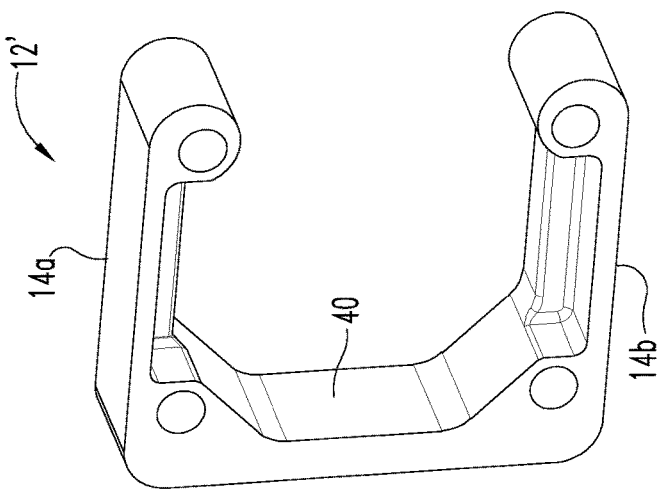
Figure 12C:
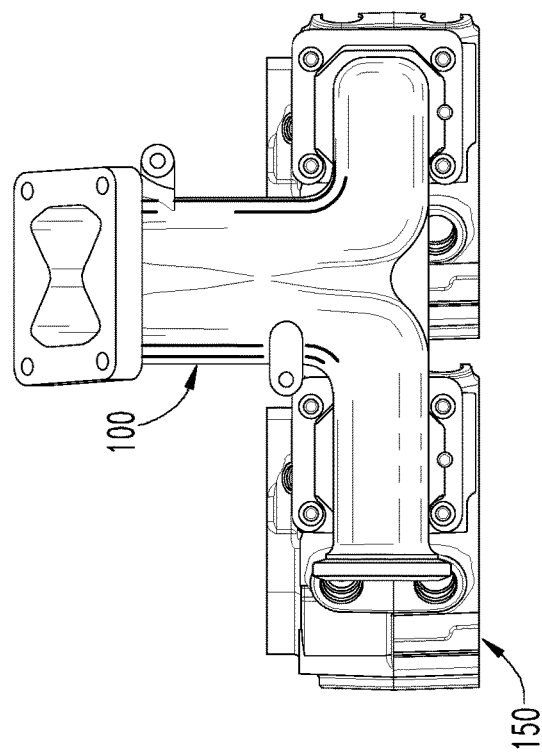
FIGS. 12A-12C are perspective views showing the FIGS. 2A-2C embodiment exhaust manifold clamps mounted to the exhaust manifold and looking toward the cylinder head.
Figure 12B:
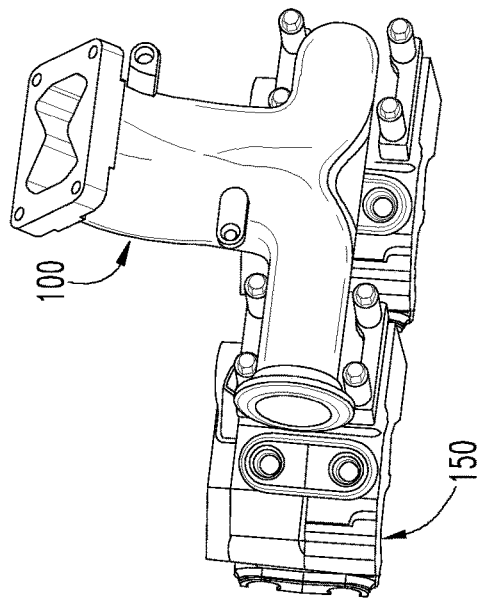
Figure 12A:
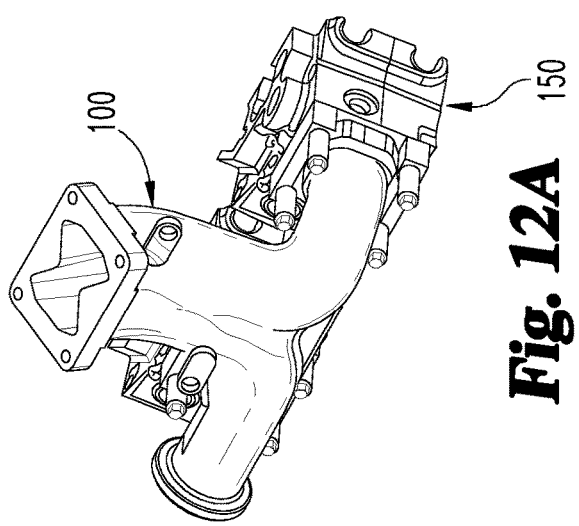
Figure 14A:
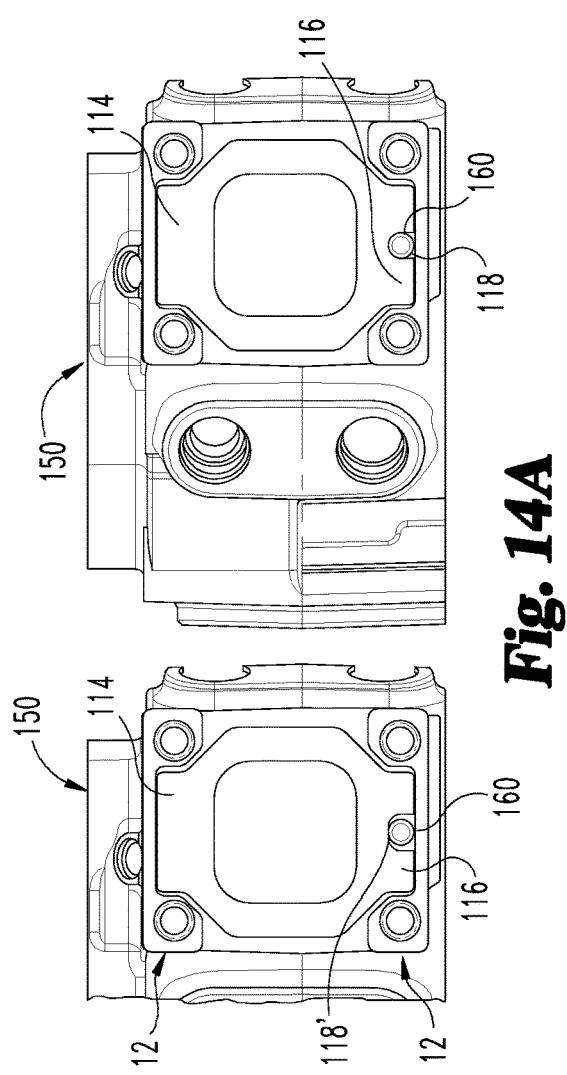
FIG. 14A is a section view through the exhaust manifold flanges and E-clamps looking toward the cylinder head and FIG. 14B is a section view of the exhaust manifold and clamps looking away from the cylinder head.
Figure 14B:
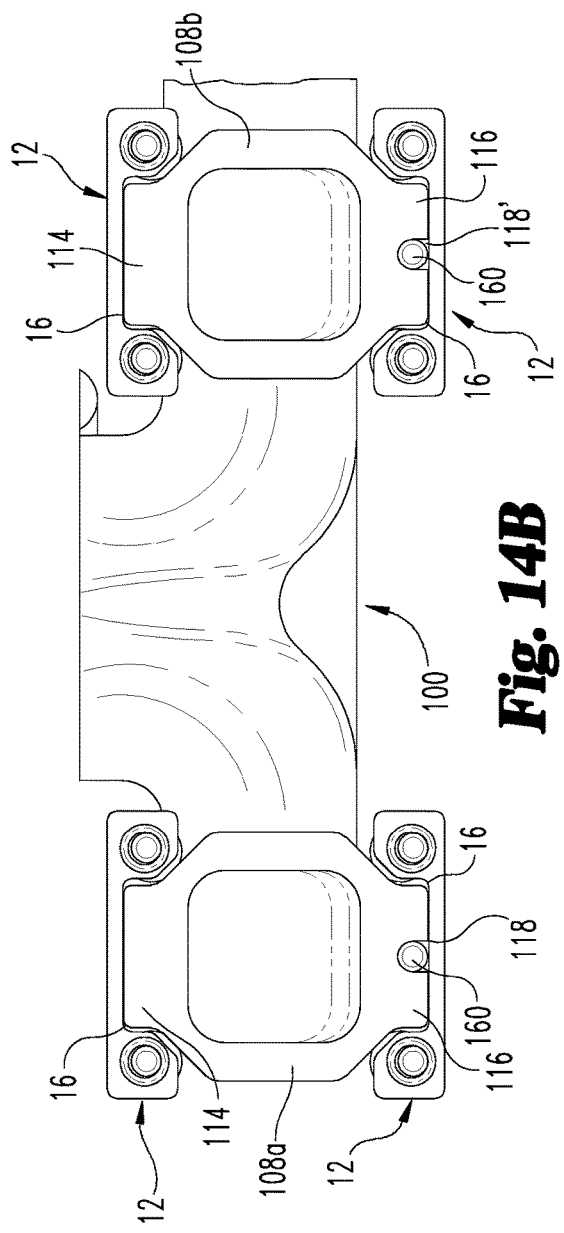
Figure 15B:
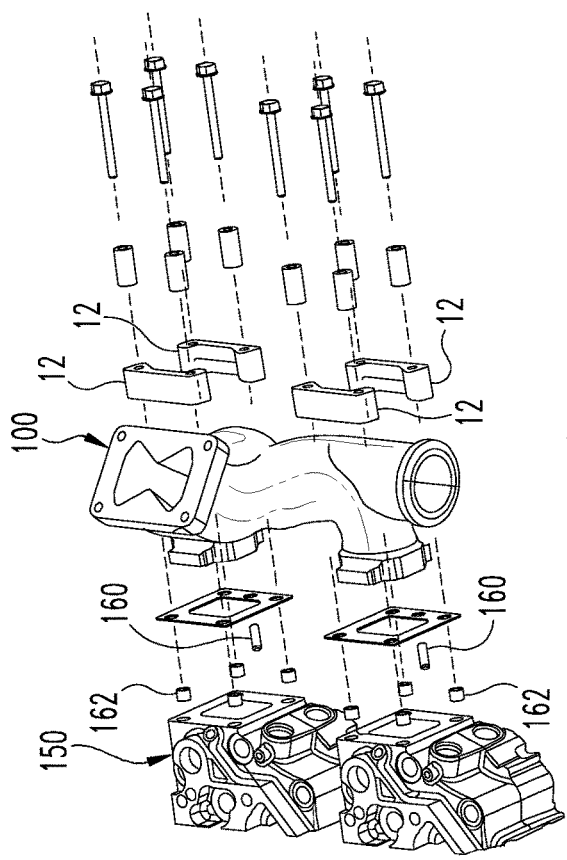
FIGS. 15A-15B are additional exploded perspective views of the exhaust manifold and exhaust manifold clamps of FIGS. 12A-12B and the cylinder head.
Figure 15A:
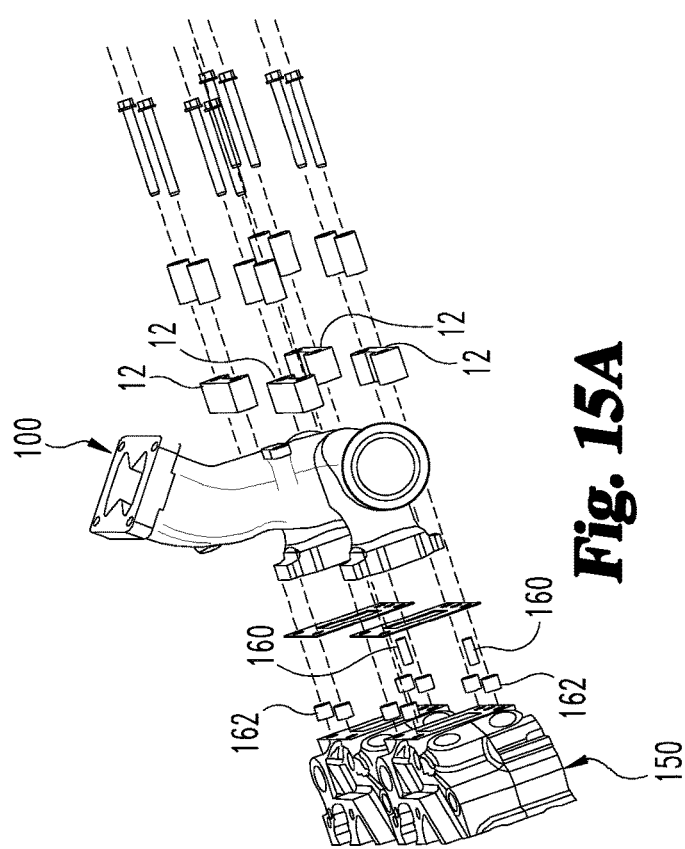

FIGS. 1A-1D and also FIGS. 5A-6B further show a first flange 108a on first inlet portion 102a of exhaust manifold 100 and a second flange 108b on second inlet portion 102b of exhaust manifold 100. Clamp assemblies 10a, 10b are mounted on respective ones of the first and second flanges 108a, 108b. See also FIGS. 7A and 7B. Clamp assemblies 10a, 10b each include at least one fastener that is engageable to a cylinder head, as discussed further below, to clampingly engage the exhaust manifold 100 against the cylinder head while permitting relative movement of the exhaust manifold relative to the clamp assemblies 10a, 10b to accommodate thermal expansion of the exhaust manifold 100 without producing undue stress on the fasteners and manifold.

Further details of one embodiment of a clamp 12 that could be employed with clamp assemblies 10a, 10b is shown in FIGS. 2A-2C. Each clamp 12 includes an elongated body 14 that has a recessed portion 16 for receiving a part of a respective one of the flanges 108a, 108b of the exhaust manifold 100. Body 14 defines a first bore 18 and a second bore 20 that each receive a corresponding fastener, as discussed further below, that engage the cylinder head 150 (FIG. 3) to clampingly secure the corresponding flange 108a, 108b against the cylinder head 150 and around the corresponding cylinder head outlet 152a, 152b. The recessed portion 16 is configured to allow the exhaust manifold 100 to move relative to the cylinder head 150 and the at least one clamp 12 in response to thermal expansion of the exhaust manifold 100.

Figure 3:
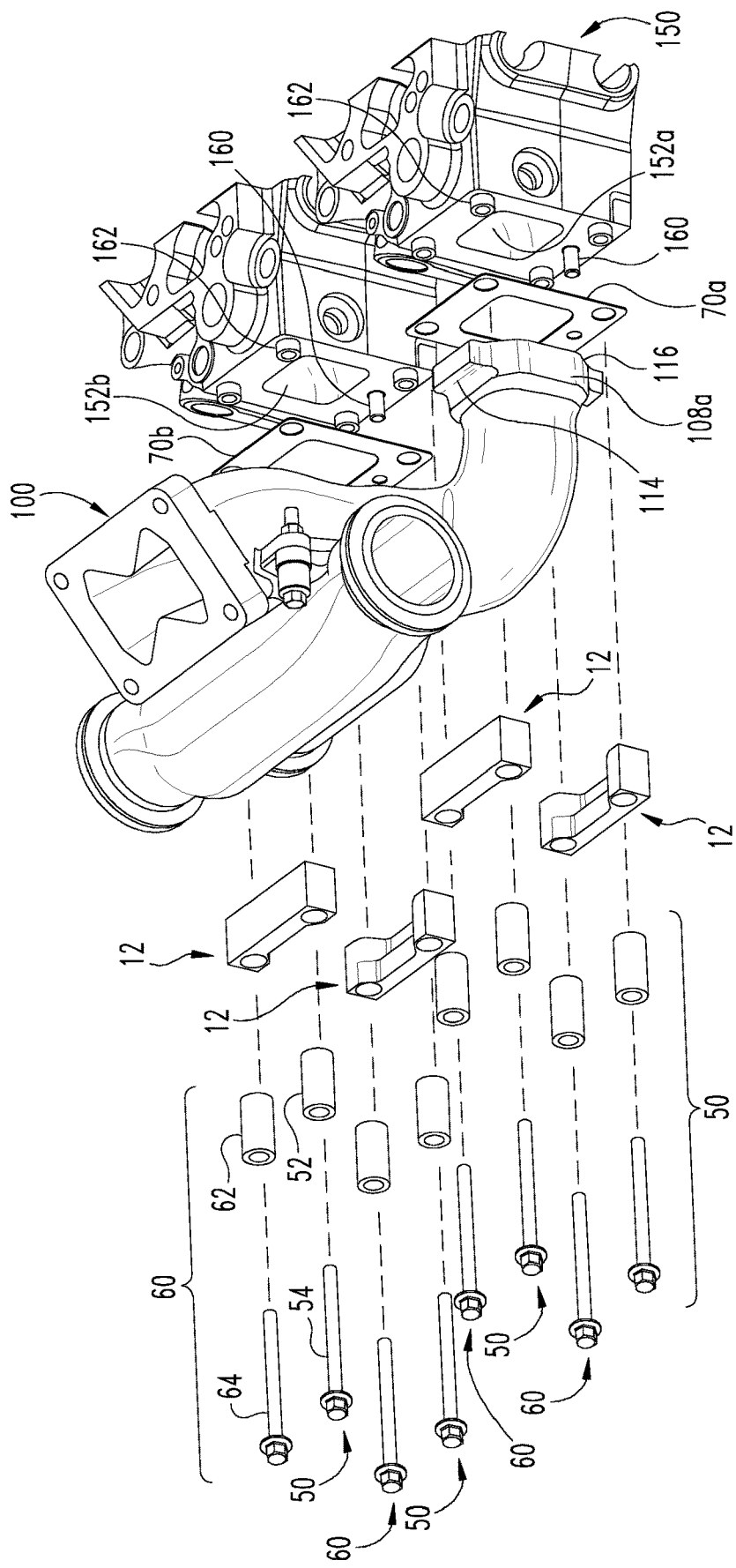
FIG. 3 shows an exploded perspective view of the exhaust manifold clamp, the exhaust manifold and the cylinder head along with fasteners for securing the exhaust manifold to the cylinder head with the exhaust manifold clamp.
Figure 4B:
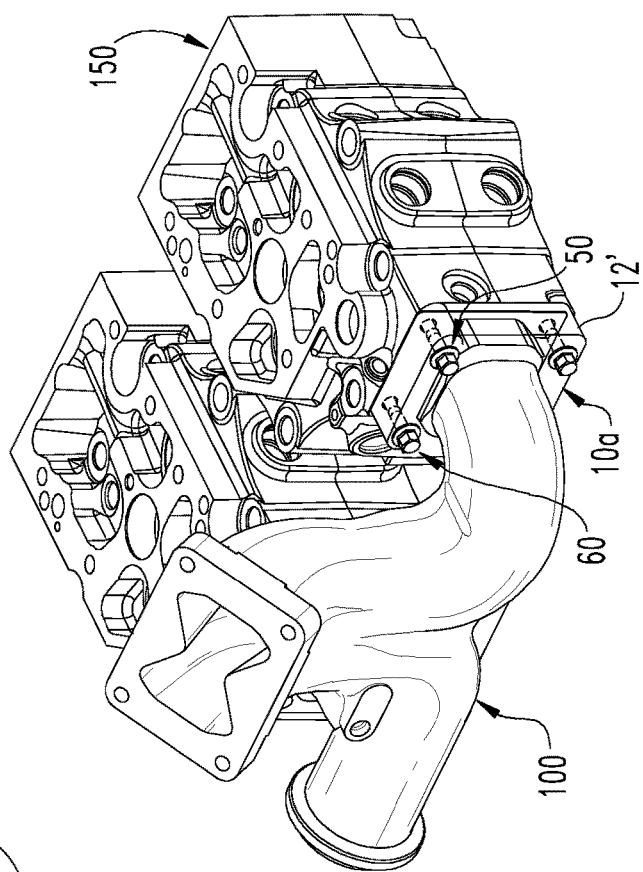
FIGS. 4A-4B are perspective views showing the exhaust manifold secured to the cylinder head with the exhaust manifold clamp.
Figure 4A:
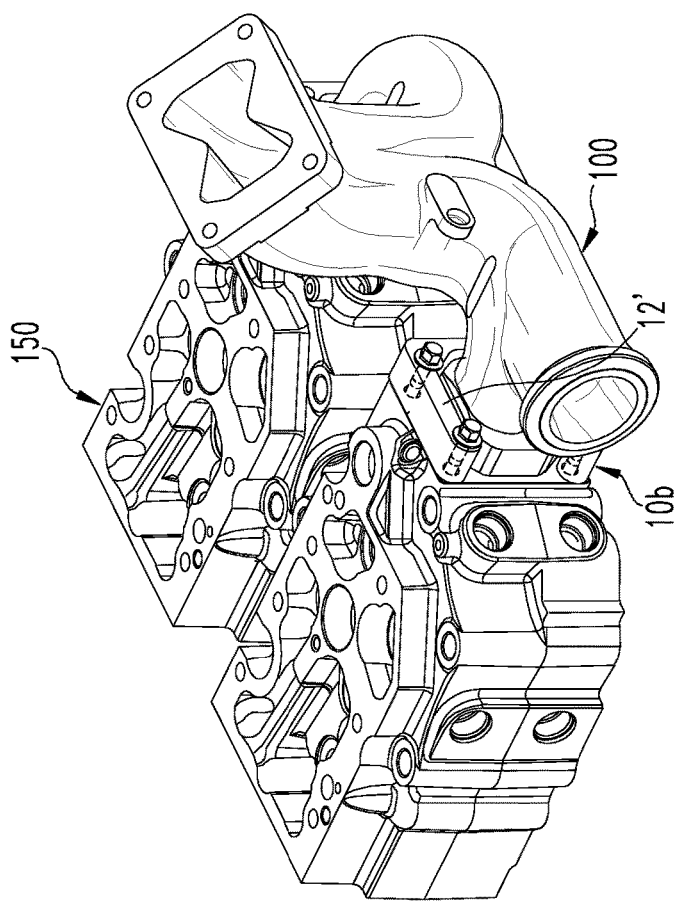
Figure 5A:
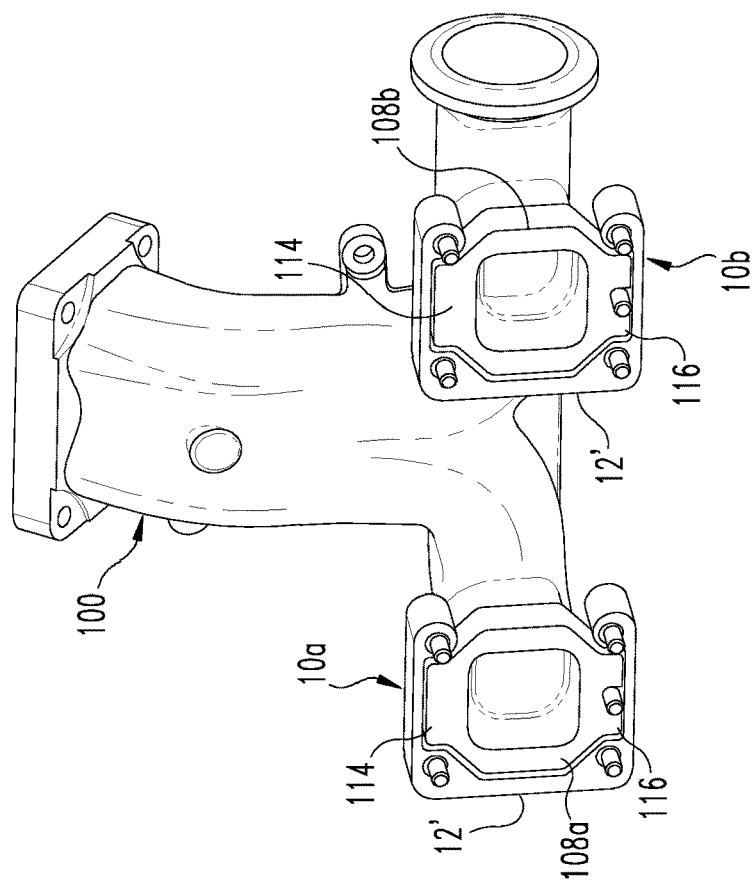
FIGS. 5A-5B are perspective views showing the FIGS. 1A-1D embodiment exhaust manifold C clamps mounted to the exhaust manifold and looking toward the cylinder head mounting faces of the exhaust manifold.
Figure 5B:
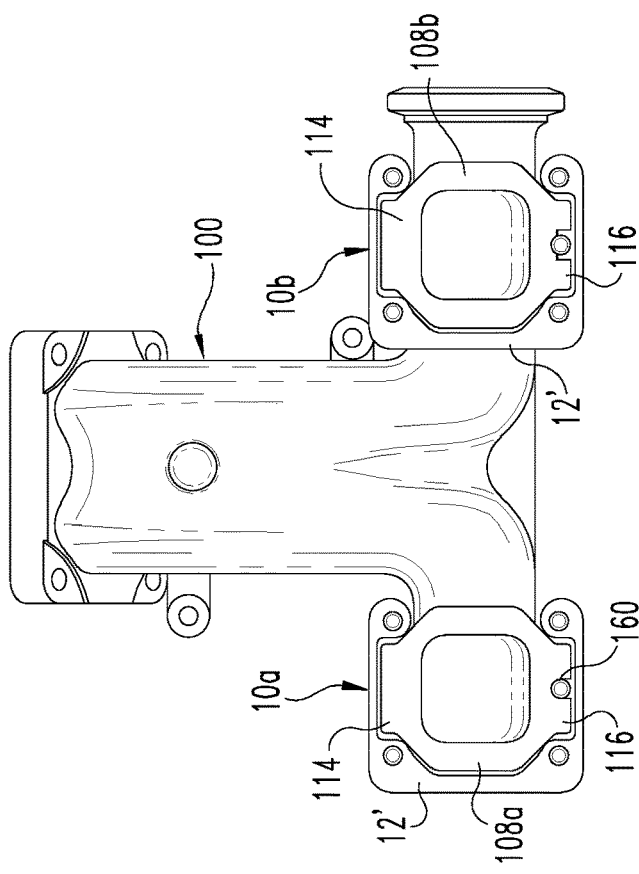
Figure 6A:
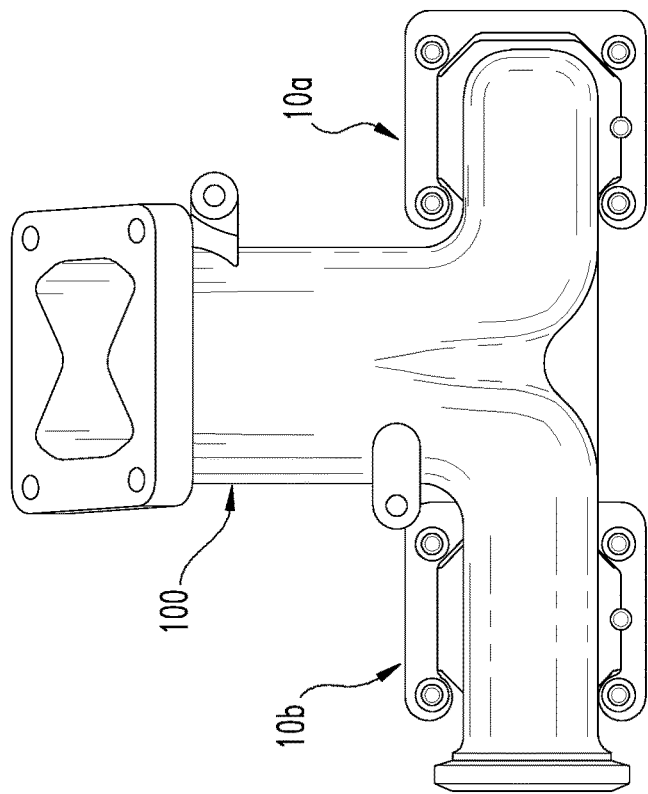
FIGS. 6A-6B are perspective views of the exhaust manifold and exhaust manifold C clamps in FIGS. 5A-5B looking toward the cylinder head.
Figure 6B:
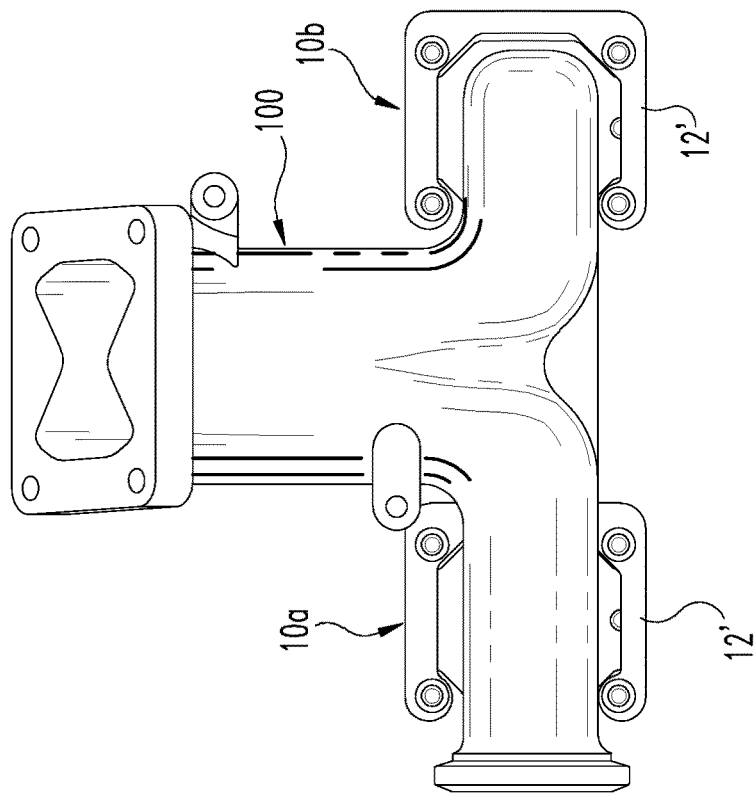

The body 14 of clamp 12 also includes a first lobe 22 at a first side of the recessed portion 16 that defines first bore 18 for receiving a first fastener 50, and a second lobe 24 at a second side of the recessed portion 16 that defines second bore 20 for receiving a second fastener 60, such as shown in FIG. 3. In FIG. 3 each fastener 50, 60 includes a sleeve 52, 62 and a cap screw 54, 64 that, respectively, are positionable in bores 18, 20.

Body 14 of the clamp 12 includes a first end surface 26 positioned toward the cylinder head 150 and an opposite second end surface 28. The first and second bores 18, 20 extend through the first and second end surfaces 26, 28. Body 14 of clamp 12 includes a first outer surface 30 opposite the recessed portion 16 that extends between the first and second end surfaces 26, 28. The recessed portion 16 includes a first surface portion 32 that extends parallel to the first outer surface 30 from the second end surface 28 to an internal lip 34 of the recessed portion 16. Lip 34 extends to a second outer surface 36 that extends parallel to the first outer surface 30 from the lip 34 to the first end surface 26.

In one embodiment, the first and second end surfaces 26, 28, the first and second outer surfaces 30, 36, and the first surface portion 32 are planar. Other embodiments contemplate that one or more of these surfaces is not planar, and any suitable shape is contemplated. In another embodiment, the first and second lobes 22, 24 project outwardly from the second outer surface 36 and the first surface portion 32 of the recessed portion 16. The first and second lobes 22, 24 each extend to the first and second end surfaces 26, 28 along the first outer surface 30. The first and second lobes 22, 24 each further extend along a respective one of opposite first and second side surfaces 37, 38. Side surfaces 37, 38 each extend between the first and second end surfaces 26, 28 along the first outer surface 30.

In FIGS. 1A-1D, FIGS. 4A-6B, and FIGS. 9B-11C, another embodiment C clamp 12' is illustrated with each of the clamp assemblies 10a, 10b. C clamp 12' can include upper and lower legs that are identical to the clamp 12 described above but further includes a strut 40 that connects ends of the upper and lower clamp body portions 14a, 14b to form a C-shaped clamp body 14' that is engaged to upper and lower tabs 114, 116 of each flange 108a, 108b. In the embodiment of FIGS. 2 and 3, the clamps 12 have separate clamp bodies that are engaged to the respective upper and lower tabs 114, 116 of the flanges 108a, 108b of the exhaust manifold 100.

In FIGS. 3, 4A-4B, 8A, 14B and other figures, the exhaust manifold 100 is shown with first inlet portion 102a and second inlet portion 102b that each includes a corresponding one of first flange 108a and second flange 108b that are positionable around respective ones of first and second cylinder head outlets 152a, 152b. Each flange 108a, 108b includes an upper tab 114 and a lower tab 116 that are engaged by a corresponding clamp 12, 12' and/or clamp body portion 14a, 14b. The recessed portion 16 of each clamp 12, 12' receives a corresponding one of the first and second tabs 114, 116 therein. The fasteners 50, 60 are engaged to the cylinder head 150 through bores 18, 20 formed in the clamps so that the flanges 108a, 108b are clamped against the adjacent face of the cylinder head 150 around the corresponding one of the first and second cylinder head outlets 152a, 152b.

The recessed portion 16 and the corresponding tab 114, 116 received therein are dimensionally controlled to allow sliding movement of the exhaust manifold 100 relative to clamp 12, 12' or clamp body 14a, 14b while clamp assemblies 10a, 10b maintain clamping engagement of the exhaust manifold 100 with the cylinder head 150 to prevent exhaust leakage. Bending loads from thermal expansion of exhaust manifold 100 are prevented from being transferred to fasteners 50, 60. The clamp assemblies 10a, 10b disclosed herein separate the exhaust gas sealing and thermal management/expansion functions with the geometry/arrangement of the tabs 114, 116 and the recessed portions 16 of clamp assemblies 110a, 110b allowing for manifold sliding relative to the clamp in the vertical and crank axis directions and providing the required sealing pressure due to the depth of the clamp recessed portion 16 and manifold tabs 114, 116. In certain embodiments, a gasket 70a, 70b is provided between flange 108a, 108b and the adjacent face of cylinder head 150. In other embodiments, the flanges 108a, 108b can include a low friction coating and/or a wear pad that facilitates movement during thermal expansion.

FIGS. 1A, 1C, 3, 5A-5B, 7A-7B, 8B, 9A-10C, and 13A-16B further illustrate a positioning and mounting arrangement to assist in locating and mounting exhaust manifold 100 on cylinder head 150. The arrangement includes one or more dowels 160 extending from the cylinder head 150 or flange 108a, 108b that are received in corresponding hole(s) to align the exhaust manifold 100 on the cylinder head 150. In one embodiment, the dowels 160 extend from cylinder head 150 and are received in a slot 118 of the corresponding tabs 116 to provide a vertical alignment (transverse to the crank axis) of the exhaust manifold 100 on the cylinder head 150 to provide vertical positioning and constrain movement in the vertical position. In another embodiment, the dowels also provide an alignment and constraint in movement along the crank axis. Combinations of these can also be used for an exhaust manifold, with one flange 108*a*, 108*b* being constrained only vertically such as provided with the wider slot 118' that is wider than dowel 160 to allow some translation along the crank axis, and the other flange 108*a*, 108*b* is constrained both vertically and along the crank axis with dowel 160 in a narrower slot 118.

The cylinder head 150 can also include ring dowels 162 in the holes 152 in the mounting face 154 of cylinder head 150 (FIG. 8B). Ring dowels 162 align the clamp 12, 12' with the cylinder head 150 and extend into the fastener holes of clamp 12 to provide the desired alignment of the clamp and cylinder head before the fasteners 50, 60 are secured.

Various aspects of the present disclosure are contemplated. According to one aspect, a system includes a cylinder head for an internal combustion engine and an exhaust manifold removably engageable to the cylinder head. The exhaust manifold includes at least one flange that is the positionable around a cylinder head outlet for exhaust flow. The system also includes at least one clamp that includes a recessed portion for receiving at least a part of the at least one flange of the exhaust manifold. The at least one clamp includes at least one bore for receiving at least one fastener that couples the at least one clamp to the cylinder head to clampingly engage the at least one flange to the cylinder head around the cylinder head outlet.

In one embodiment, the recessed portion of the at least one clamp is configured to receive a tab of the at least one flange and allow the exhaust manifold to move relative to the at least one clamp in response to thermal expansion of the exhaust manifold while clampingly engaging the at least one flange to the cylinder head.

In another embodiment, the at least one clamp includes a body defining the recessed portion, a first lobe at a first side of the recessed portion that defines a first bore for receiving a first fastener, and a second lobe at a second side of the recessed portion opposite the first side, the second lobe defining a second bore for receiving a second fastener.

In a refinement of this embodiment, the body of the at least one clamp includes a first end surface positioned toward the cylinder head and an opposite second end surface, and the first and second bores extend through the first and second end surfaces. In a further refinement, the body of the at least one clamp includes a first outer surface opposite the recessed portion, the first outer surface extends between the first and second end surfaces, the recessed portion includes a first surface portion that extends parallel to the first outer surface from the second end surface to an internal lip of the recessed portion, and the internal lip extends to a second outer surface that extends parallel to the first outer surface from the lip to the first end surface.

In yet a further refinement, the first and second end surfaces, the first and second outer surfaces, and the first surface portion are planar. In another refinement, the first and second lobes project outwardly from the second outer surface and the first surface portion of the recessed portion. In still a further refinement, the first and second lobes each extend between the first and second end surfaces along the first outer surface, the first and second lobes each further extend along a respective one of opposite first and second side surfaces of the body of the clamp, and the first and second side surfaces each extend between the first and second end surfaces along the first outer surface.

In another embodiment, the at least one fastener includes a sleeve that is positioned in the at least one bore and a cap screw that is positioned through the sleeve. In yet another embodiment, the at least one flange of the exhaust manifold includes at least one of a low friction coating and a wear pad that is positioned against the cylinder head and/or manifold-clamp interface.

In another embodiment, the exhaust manifold includes a first inlet portion and a second inlet portion that each include a corresponding one of a first flange and a second flange that are positionable around respective ones of first and second cylinder head outlets. The at least one clamp includes a first clamp and a second clamp that each include a recessed portion for receiving a corresponding one of the first flange and the second flange of the exhaust manifold, and each of the first and second clamps includes at least two bores each for receiving a fastener that engages the cylinder head to clampingly engage the at least one flange around the corresponding one of the first and second cylinder head outlets.

In a refinement of this embodiment, the first and second inlet portions of the exhaust manifold come together at a common outlet of the exhaust manifold. In a further refinement, the exhaust manifold includes a connecting portion for connection with a second exhaust manifold.

In another embodiment, the at least one clamp includes a first clamp body engaged to an upper end of the at least one flange of the exhaust manifold and a second clamp body movably engaged to a lower end of the at least one flange of the exhaust manifold. Each of the first and second clamp bodies include at least one bore for receiving at least one fastener that engages the cylinder head to clampingly engage the at least one flange around the cylinder head outlet with the first and second clamp bodies. In a refinement of this embodiment, the first and second clamp bodies are joined together at one end with a strut to provide a C-shaped clamping assembly.

According to another aspect, an apparatus for clamping an exhaust manifold flange around an outlet of a cylinder head of an internal combustion engine is provided. The apparatus includes a clamp with a clamp body with a recessed portion for receiving at least a part of the exhaust manifold flange. The body of the clamp includes at least one bore for receiving at least one fastener that couples the body of the clamp to the cylinder head to clampingly engage the exhaust manifold flange to the cylinder head around the outlet.

In one embodiment, the recessed portion of the clamp body is configured relative to the part of the exhaust manifold flange to allow the exhaust manifold to move relative to the clamp in response to thermal expansion of the exhaust manifold with the flange clampingly engaged to the cylinder head.

In another embodiment, the body of the clamp includes a first lobe at a first side of the recessed portion that defines a first bore for receiving a first fastener, and a second lobe at a second side of the recessed portion opposite the first side, the second lobe defining a second bore for receiving a second fastener. In a refinement of this embodiment, the body of the clamp includes a first end surface positioned toward the cylinder head and an opposite second end surface, and the first and second bores extend through the first and second end surfaces.

In a further refinement of the embodiment, the body of the clamp includes a first outer surface opposite the recessed portion. The first outer surface extends between the first and second end surfaces, and the recessed portion includes a first surface portion that extends parallel to the first outer surface from the second end surface to an internal lip of the recessed portion. The internal lip extends to a second outer surface that extends parallel to the first outer surface from the lip to the first end surface.

In yet a further refinement, the first and second end surfaces, the first and second outer surfaces, and the first surface portion are planar, and the first and second lobes project outwardly from the second outer surface and the first surface portion of the recessed portion. In still another refinement, the first and second lobes each extend between the first and second end surfaces along the first outer surface, and the first and second lobes each further extend along a respective one of opposite first and second side surfaces of the body of the clamp. The first and second side surfaces each extend between the first and second end surfaces along the first outer surface.

According to another aspect, an apparatus for clamping an exhaust manifold flange around an outlet of a cylinder head of an internal combustion engine is provided. The apparatus has a clamp including a first clamp body with a first recessed portion for receiving a first part of a flange of the exhaust manifold. The clamp further includes a second clamp body with a second recessed portion for receiving a second part of the flange of the exhaust manifold. Each of the first and second clamp bodies includes at least one bore for receiving at least one fastener to couple the first and second clamp bodies to the cylinder head and clampingly engage the flange around the outlet of the cylinder head.

In one embodiment, the first and second clamp bodies are joined together at one end with a strut to provide a C-shaped clamping assembly.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
   a cylinder head for an internal combustion engine;
   an exhaust manifold removably engageable to the cylinder head, the exhaust manifold including at least one flange that is the positionable around a cylinder head outlet for exhaust flow; and
   at least one clamp that includes a recessed portion for receiving at least a part of the at least one flange of the exhaust manifold, a first lobe at a first side of the recessed portion that includes a first bore for receiving a first fastener, and a second lobe at a second side of the recessed portion opposite the first side that includes a second bore for receiving a second fastener, the first fastener and the second fastener coupling the at least one clamp to the cylinder head to clampingly engage the at least one flange to the cylinder head around the cylinder head outlet.

2. The system of claim 1, wherein the recessed portion of the at least one clamp is configured to receive a tab of the at least one flange and allow the exhaust manifold to move relative to the at least one clamp in response to thermal expansion of the exhaust manifold while clampingly engaging the at least one flange to the cylinder head.

3. The system of claim 1, wherein the at least one clamp includes a body defining the recessed portion.

4. The system of claim 3, wherein the body of the at least one clamp includes a first end surface positioned toward the cylinder head and an opposite second end surface, and the first and second bores extend through the first and second end surfaces.

5. The system of claim 4, wherein the body of the at least one clamp includes a first outer surface opposite the recessed portion, the first outer surface extending between the first and second end surfaces, the recessed portion including a first surface portion that extends parallel to the first outer surface from the second end surface to an internal lip of the recessed portion, and the internal lip extending to a second outer surface that extends parallel to the first outer surface from the lip to the first end surface.

6. The system of claim 5, wherein the first and second end surfaces, the first and second outer surfaces, and the first surface portion are planar.

7. The system of claim 5, wherein the first and second lobes project outwardly from the second outer surface and the first surface portion of the recessed portion.

8. The system of claim 7, wherein the first and second lobes each extend between the first and second end surfaces along the first outer surface, the first and second lobes each further extending along a respective one of opposite first and second side surfaces of the body of the clamp, wherein the first and second side surfaces each extend between the first and second end surfaces along the first outer surface.

9. The system of claim 1, wherein the at least one clamp includes a first clamp body engaged to an upper end of the at least one flange of the exhaust manifold and a second clamp body movably engaged to a lower end of the at least one flange of the exhaust manifold, each of the first and second clamp bodies including at least one bore for receiving at least one fastener that engages the cylinder head to clampingly engage the at least one flange around the cylinder head outlet with the first and second clamp bodies.

10. The system of claim 9, wherein the first and second clamp bodies are joined together at one end with a strut to provide a C-shaped clamping assembly.

11. The system of claim 1, wherein the at least one flange of the exhaust manifold includes at least one of a low friction coating and a wear pad that is positioned against the cylinder head and/or manifold-clamp interface.

12. A system, comprising:
    a cylinder head for an internal combustion engine;
    an exhaust manifold removably engageable to the cylinder head, the exhaust manifold including at least one flange that is the positionable around a cylinder head outlet for exhaust flow; and
    at least one clamp that includes a recessed portion for receiving at least a part of the at least one flange of the exhaust manifold, the at least one clamp including at least one bore for receiving at least one fastener that couples the at least one clamp to the cylinder head to clampingly engage the at least one flange to the cylinder head around the cylinder head outlet, wherein the at least one fastener includes a sleeve that is positioned in the at least one bore and a cap screw that is positioned through the sleeve.

13. The system of claim 12, wherein the exhaust manifold includes a first inlet portion and a second inlet portion that each include a corresponding one of a first flange and a second flange that are positionable around respective ones of first and second cylinder head outlets, and the at least one clamp includes a first clamp and a second clamp that each include a recessed portion for receiving a corresponding one of the first flange and the second flange of the exhaust manifold, and each of the first and second clamps includes at least two bores each for receiving a fastener that engages the cylinder head to clampingly engage the at least one flange around the corresponding one of the first and second cylinder head outlets.

14. A system, comprising:
a cylinder head for an internal combustion engine;
an exhaust manifold removably engageable to the cylinder head, the exhaust manifold including a first inlet portion and a second inlet portion that each include a corresponding one of a first flange and a second flange that are positionable around respective ones of first and second cylinder head outlets for exhaust flow, wherein the first and second inlet portions of the exhaust manifold come together at a common outlet of the exhaust manifold;
a first clamp and a second clamp that each include a recessed portion for receiving a corresponding one of the first flange and the second flange of the exhaust manifold, and each of the first and second clamps includes at least two bores each for receiving a fastener that engages the cylinder head to clampingly engage corresponding ones of the first flange and the second flange around the corresponding one of the first and second cylinder head outlets.

15. The system of claim 14, wherein the exhaust manifold includes a connecting portion for connection with a second exhaust manifold.

16. An apparatus for clamping an exhaust manifold flange around an outlet of a cylinder head of an internal combustion engine, comprising:
a clamp including a clamp body with a recessed portion for receiving at least a part of the exhaust manifold flange, the body of the clamp including at least one bore for receiving at least one fastener that couples the body of the clamp to the cylinder head to clampingly engage the exhaust manifold flange to the cylinder head around the outlet, wherein the body of the clamp includes a first lobe at a first side of the recessed portion that defines a first bore for receiving a first fastener, and a second lobe at a second side of the recessed portion opposite the first side, the second lobe defining a second bore for receiving a second fastener.

17. The apparatus of claim 16, wherein the recessed portion of the clamp body is configured relative to the part of the exhaust manifold flange to allow the exhaust manifold to move relative to the clamp in response to thermal expansion of the exhaust manifold with the flange clampingly engaged to the cylinder head.

18. The apparatus of claim 16, wherein the body of the clamp includes a first end surface positioned toward the cylinder head and an opposite second end surface, and the first and second bores extend through the first and second end surfaces.

19. The apparatus of claim 18, wherein the body of the clamp includes a first outer surface opposite the recessed portion, the first outer surface extending between the first and second end surfaces, and the recessed portion including a first surface portion that extends parallel to the first outer surface from the second end surface to an internal lip of the recessed portion, the internal lip extending to a second outer surface that extends parallel to the first outer surface from the lip to the first end surface.

20. The apparatus of claim 19, wherein:
the first and second end surfaces, the first and second outer surfaces, and the first surface portion are planar; and
the first and second lobes project outwardly from the second outer surface and the first surface portion of the recessed portion.

21. The apparatus of claim 20, wherein the first and second lobes each extend between the first and second end surfaces along the first outer surface, the first and second lobes each further extending along a respective one of opposite first and second side surfaces of the body of the clamp, wherein the first and second side surfaces each extend between the first and second end surfaces along the first outer surface.

22. An apparatus for clamping an exhaust manifold flange around an outlet of a cylinder head of an internal combustion engine, comprising:
a clamp including a first clamp body with a first recessed portion for receiving a first part of a flange of the exhaust manifold, the clamp further including a second clamp body with a second recessed portion for receiving a second part of the flange of the exhaust manifold, each of the first and second clamp bodies including at least one bore for receiving at least one fastener to couple the first and second clamp bodies to the cylinder head and clampingly engage the flange around the outlet of the cylinder head, wherein the first and second clamp bodies are joined together at one end with a strut to provide a C-shaped clamping assembly.

* * * * *